United States Patent [19]
Matsui

[11] Patent Number: 5,736,712
[45] Date of Patent: Apr. 7, 1998

[54] ARC WELDING TORCH

[75] Inventor: Hitoshi Matsui, Toyota, Japan

[73] Assignee: Toyota Jidosha Kabushiki Kaisha, Toyota, Japan

[21] Appl. No.: 672,031

[22] Filed: Jun. 26, 1996

[30] Foreign Application Priority Data

Jul. 20, 1995 [JP] Japan .................... 7-183850

[51] Int. Cl.$^6$ ........................................ B23K 9/12
[52] U.S. Cl. ........................... 219/137.2; 219/136
[58] Field of Search ..................... 219/137.2, 137.8, 219/137.31, 136

[56] References Cited

U.S. PATENT DOCUMENTS

| | | | |
|---|---|---|---|
| 2,981,825 | 4/1961 | Rundell | 219/136 |
| 3,901,425 | 8/1975 | Taylor et al. | |
| 4,249,062 | 2/1981 | Hozumi et al. | 219/137.8 |
| 4,898,317 | 2/1990 | Ito et al. | 219/137.8 |

FOREIGN PATENT DOCUMENTS

A-59-16677  1/1984  Japan.
WO 88/03852  6/1988  WIPO.

*Primary Examiner*—Clifford C. Shaw
*Attorney, Agent, or Firm*—Oliff & Berridge, P.L.C.

[57] ABSTRACT

An arc welding torch which can generate an electric arc in a predetermined position even when large rotational torque acts on welding wire. A passage of the arc welding torch has a plurality of curves which are taken first in one direction and then in another direction along the passage, and the curvature radius and curve angle of each of the curves are designed so that minimum torque T1 which is necessary for the welding wire to turn in the guide passage is greater than torque T2 which causes torsional yielding of the welding wire. Owing to the curvature radius and curve angle of each of the curves and elasticity of the welding wire which comes in contact with each of the curves, the welding wire is inhibited from turning in the guide passage. Therefore, a fore end of the welding wire occupies the same position with respect to the current feed chip, and an electric arc can be generated in a desired position.

2 Claims, 5 Drawing Sheets

ARC WELDING TORCH

BACKGROUND OF THE INVENTION

1. Field of the Invention

This invention relates to an arc welding torch used in an arc welding apparatus, and more particularly to an arc welding torch which is capable of controlling the position of a fore end of welding wire more precisely.

2. Description of the Related Art

An arc welding torch is connected to a flexible wire guide conduit at one end, and provided with a current feed chip at the other end, and has a wire guide passage on the inside which welding wire penetrates. The inner diameter of the current feed chip is designed to be slightly larger than the outer diameter of the welding wire in order to achieve smooth supply of the welding wire. Further, since the welding wire is deformed in being packaged or being passed through the wire guide conduit, the welding wire is fed from the current feed chip with some curves.

The gap between the inner diameter of the current feed chip and the outer diameter of the welding wire, and the curves of the welding wire make the welding wire fed with some curves from the current feed chip. This offers some problems: An electric arc is not generated at a desired portion of a member to be welded, and the shape of bead is not uniform.

As a means for overcoming these problems, Japanese Examined Utility Model publication (KOUKOKU) No. 6-38621 discloses a torch having a wire guide passage with a plurality of curves in different directions. Owing to this configuration, while welding wire passes through the wire guide passage, the curve direction and curvature radius of the welding wire are reformed so that the welding wire curved with a predetermined radius of curvature in the same direction is fed from a current feed chip. In this arc welding torch, even when welding wire to enter into the wire guide passage has curves in various shapes and directions, a fore end of the welding wire is always located in a predetermined position ahead of the current feed chip and an electric arc can be generated in a desired position, because the curve direction and curvature radius of the welding wire are reformed.

In operation, an arc welding torch is used while transferred by a robot or the like along portions to be welded. In this case, the arc welding torch makes complicated moves such as being twisted, being turned, and being conveyed in the reverse direction. These moves of the arc welding torch make the welding wire in the flexible wire guide conduit turn and the welding wire fed from the current feed chip also turn. That is to say, the welding wire relatively turns with respect to the current feed chip. Since the current feed chip is formed to have a certain radius of curvature, when the welding wire turns, the fore end of the welding wire draws a circle around the current feed chip, and an electric arc is not generated at a desired portion of a member to be welded. Therefore, desired portions cannot be accurately fused, and welding defects such as poor penetration and cavity formation are liable to occur.

SUMMARY OF THE INVENTION

The present invention has been conceived to dissolve these inconveniences. It is an object of the present invention to provide an arc welding torch which is capable of generating an electric arc in a predetermined position even when large rotational torque acts on welding wire.

The arc welding torch according to the present invention is connected to a flexible wire guide conduit at one end, and provided with a current feed chip at the other end, and has a wire guide passage on the inside which welding wire penetrates, wherein:

the wire guide passage has a plurality of curves which are taken first in one direction and then in another direction along the passage, and the curvature radius and curve angle of each of the curves are designed so that minimum torque T1 which is necessary for the welding wire to turn in the guide passage is greater than torque T2 which causes torsional yielding of the welding wire.

The are welding torch of the present invention has a wire guide passage with a plurality of curves, and owing to the curvature radius and curve angle of each of the curves, and frictional force caused by elasticity of the welding wire which is in contact with each of the curves, the welding wire is inhibited from turning in the wire guide passage. Since the rotation inhibition torque T1 is greater than torsional yielding torque T2 of the welding wire, when large rotational torque acts on the welding wire, the welding wire in itself is twisted to absorb rotational displacement, and the welding wire does not turn in the wire guide passage of the arc welding torch. Therefore, the fore end of the welding wire always occupies the same position with respect to the current feed chip, and an electric arc can be generated in a predetermined position.

Typical welding wire constituting a consumable electrode to be used for an arc welding torch has an outer diameter of 1.2 mm. This welding wire having a length of 1.5 m was fixed at one end and twisted at the other end in a flexible conduit constituting a flexible wire guide conduit and having a passage inner diameter of 2.4 mm. Then the relation between wire torsion angle $\alpha(\times 360°)$ and wire torque T (N·cm) was examined and the result is shown in FIG. 5. FIG. 5 indicates that torsional yielding torque T2 of this welding wire was approximately 30 N·cm.

Then, ceramic pipes of 2.4 mm in inner diameter constituting a wire guide passage of the arc welding torch which employs welding wire of 1.2 mm in outer diameter were bent at one end to form twelve kinds of wire guide passages:

a) a wire guide passage curved with a curvature radius of 38 mm at a curve angle of 90°;

b) a wire guide passage curved with a curvature radius of 38 mm at a curve angle of 120°;

c) a wire guide passage curved with a curvature radius of 38 mm at a curve angle of 150°;

d) a wire guide passage curved with a curvature radius of 38 mm at a curve angle of 180°;

e) a wire guide passage curved with a curvature radius of 52 mm at a curve angle of 90°;

f) a wire guide passage curved with a curvature radius of 52 mm at a curve angle of 120°;

g) a wire guide passage curved with a curvature radius of 52 mm at a curve angle of 180°;

h) a wire guide passage curved with a curvature radius of 52 mm at a curve angle of 300°;

i) a wire guide passage curved with a curvature radius of 68 mm at a curve angle of 90°;

j) a wire guide passage curved with a curvature radius of 68 mm at a curve angle of 180°;

k) a wire guide passage curved with a curvature radius of 68 mm at a curve angle of 360°;

l) a wire guide passage curved with a curvature radius of 68 mm at a curve angle of 540°.

These twelve kinds of wire guide passages were passed through by the aforementioned welding wire, and each of the wire guide passages was fixed. Then rotational torque was applied to one end of each welding wire, and torque acting on each welding wire was measured. The results are shown in FIG. 6.

FIG. 6 demonstrates that with regards to wire guide passages having a curvature radius of 38 mm, the welding wire slid and turned in three kinds of wire guide passages curved at curve angles of 90°, 120°, and 150°, and that necessary rotational torque increased as the curve angle increased. In the wire guide passage curved with a curvature radius of 38 mm at a curve angle of 180°, it was confirmed that the welding wire did not slide and that the welding wire in itself gave torsional yielding. The yielding torque was about 30 N·cm.

With reference to wire guide passages having a curvature radius of 52 mm, in three kinds of wire guide passages having curve angles of 90°, 120°, and 180°, the welding wire slid and turned, and as the curve angle increased, necessary rotational torque increased. In the wire passage curved with a curvature radius of 52 mm at a curve angle of 300°, it was confirmed that the welding wire did not slide and that the welding wire in itself gave torsional yielding. The yielding torque was about 30 N·cm.

As for wire guide passages having a curvature radius of 68 mm, in three kinds of wire guide passages having curve angles of 90°, 180°, and 360°, the welding wire slid and turned, and necessary rotational torque increased with larger curve angles. In the wire guide passages curved with a curvature radius of 68 mm at a curve angle of 540°, it was confirmed that the welding wire did not slide and that the welding wire in itself gave torsional yielding. This yielding torque was also approximately 30 N·cm.

Straight line segments in FIG. 6 indicating the facts that the welding wire slid in the wire guide passages and that torque generated can be utilized as basic data for designing wire guide passages.

A smaller radius of curvature and a larger angle of curve are preferable in order to prevent welding wire from turning in a wire guide passage of an arc welding torch. In view of this, it is desirable that the total of the curvature radii of the respective curves constituting the wire guide passage is less than 120 mm, and that the total of the curve angles of the respective curves is more than 120°. Further, in order that the fore end of the welding wire fed from the current feed chip is located on the axial line of the arc welding torch, it is preferable that the wire guide passage has a plurality of curves comprising a first curve on the side of the current feed chip and a second curve on the side of the flexible wire guide conduit, and that the following formulae are satisfied:

R1+R2≦104 mm, θ1−θ2≧0, and θ2≧60°, wherein R1 is a curvature radius of the first curve, θ1 is a curve angle of the first curve, R2 is a curvature radius of the second curve, and θ2 is a curve angle of the second curve. The reason why θ1−θ2≧0 is to reform the welding wire in the first curve and give a curve with a predetermined radius of curvature.

Now, functions and advantages of the present invention will be described.

An arc welding torch of the present invention has a wire guide passage with a plurality of curves, and has rotation inhibition torque T1 owing to the curvature radius and curve angle of each of the curves and frictional force caused by elasticity of welding wire which is in contact with each of the curves. This rotation inhibition torque T1 is greater than torsional yielding torque T2 of the welding wire. Therefore, when large rotation torque acts on the welding wire, the welding wire in itself is twisted to absorb rotational displacement, and the welding wire does not turn in the wire guide passage of the arc welding torch. As a result, the fore end of the welding wire always occupies the same position with respect to the current feed chip, and the arc welding torch of the present invention can generate an electric arc in a predetermined position.

BRIEF DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which.

DETAILED DESCRIPTION OF THE PREFERRED EMBODIMENT

Figure 1:
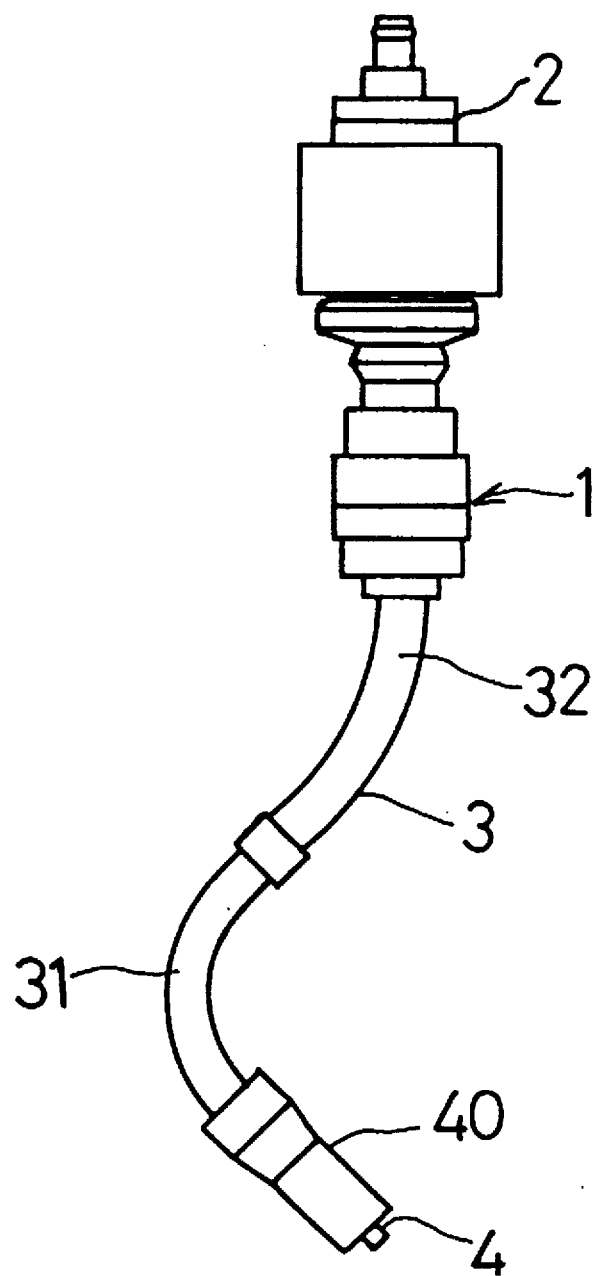
FIG. 1 is an elevation of an arc welding torch of a preferred embodiment of the present invention.
Figure 2:
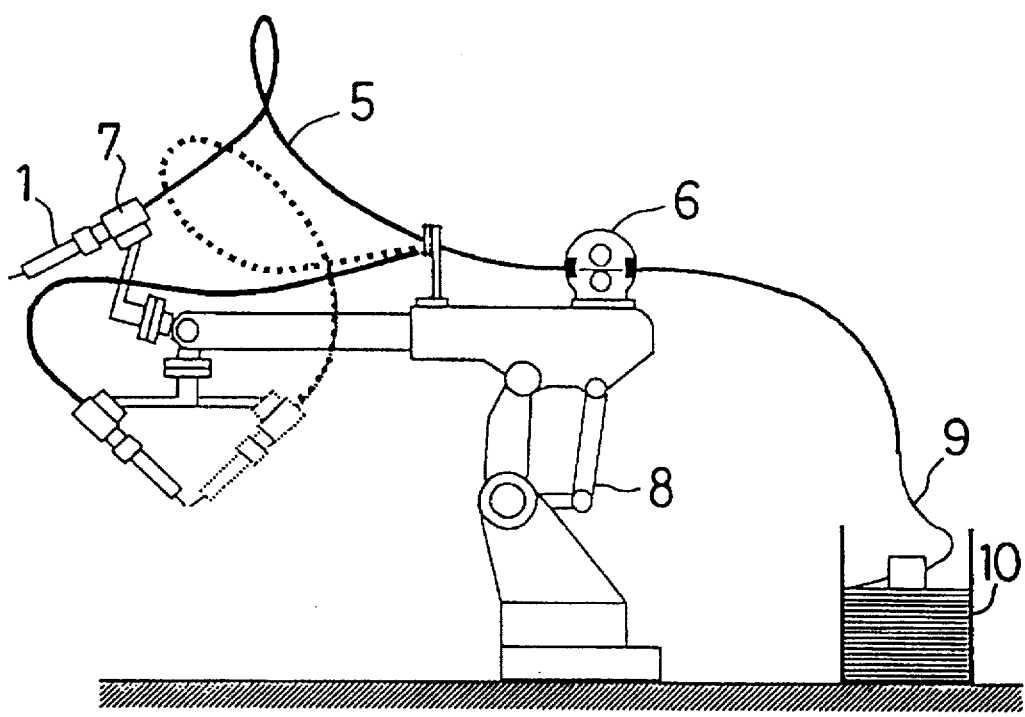
FIG. 2 shows that a welding robot moves a flexible conduit connected to an arc welding torch.

An arc welding torch according to a preferred embodiment of the present invention will be described with reference to drawings. FIG. 1 illustrates an elevation of the arc welding torch according to the preferred embodiment of the present invention. The arc welding torch 1 comprises a base 2, a tube 3 extending from the base 2, a gas shield 40 fixed to a fore end of the tube 3, and a current feed chip 4 fixed on a shaft center of the gas shield nozzle 40. As shown in FIG. 2, a flexible conduit 5 constituting a flexible wire guide conduit is connected to the other end of the base 2. The other end of the flexible conduit 5 is connected to a wire feed motor 6. A bracket 7 is attached on the outer periphery of the base 2, and fixed to a wrist of a welding robot 8.

The tube 3 has a double-layered structure, comprising an outer tube formed of copper and an inner tube formed of ceramics. The tube 3 comprises a wire guide passage (not shown) on the inside which welding wire penetrates and which communicates with the flexible wire guide conduit, a shielding gas supply passage (not shown) formed between the outer tube and the inner tube, and the outer tube (not shown) which also serves as a conductor. The current feed chip 4 has a current feed port (not shown) at the shaft center which communicates with the wire guide passage, and a nozzle hole formed on the outer periphery of the current feed port and constituting an annular shielding gas supply port.

The tube 3 has a first curved portion 31 which is located on the side of the current feed chip 4 and which has a curvature radius of 36 mm and a curve angle of 90°, and a second curved portion 32 which is connected to the first curved portion 31 and located on the side of the base 2 and which has a curvature radius of 68 mm and a curve angle of 60° C. The wire guide passage at the first curved portion 31 and the second curved portion 32 respectively possesses a first curve which has a curvature radius of 36 mm and a curve angle of 90°, and a second curve which is connected to the first curve and located on the side of the base 2 and which has a curvature radius of 68 mm and a curve angle of 60°.

The arc welding torch of this preferred embodiment is thus constructed.

Welding wire 9 is stored in a wire supply part 10 as reeled wire. One end of the welding wire 9 passes through the wire feed motor 6, the flexible conduit 5, the base 2, the wire guide passage of the tube 3, and the current feed port of the current feed chip 4, and projects outwards. The welding wire 9 is subjected to bending by being curved with a curvature radius of 200 mm by the second curve of the wire guide passage of the tube 3, and then curved with a curvature radius of 70 mm in the opposite direction by the first curve. While the welding wipe 9 is guided along the first curve and the second curve, the welding wipe 9 strongly presses the first curve and the second curve due to the elastic force of the welding wire 9 which generates as resiliency. Frictional force caused by this pressure firmly holds the welding wipe 9 in the wire guide passage of the tube 3, so as to generate strong force which is resistant to force of turning the welding wipe 9 relatively in the wipe guide passage of the tube 3.

In the arc welding torch of this preferred embodiment, as shown in FIG. 2, bend and twist were given to the flexible conduit 5 by swinging and turning the wrist of the robot, but the welding wipe 9 projecting from the current feed chip 4 did not turn at all.

Further, the welding wire 9 was out at the wire feed motor 6, and turn was given to the welding wire 9 at the cut end. However, it was confirmed that the welding wire 9 projecting from the current feed chip 4 did not turn at all, and that the welding wire 9 caused torsional yielding.

Figure 3:
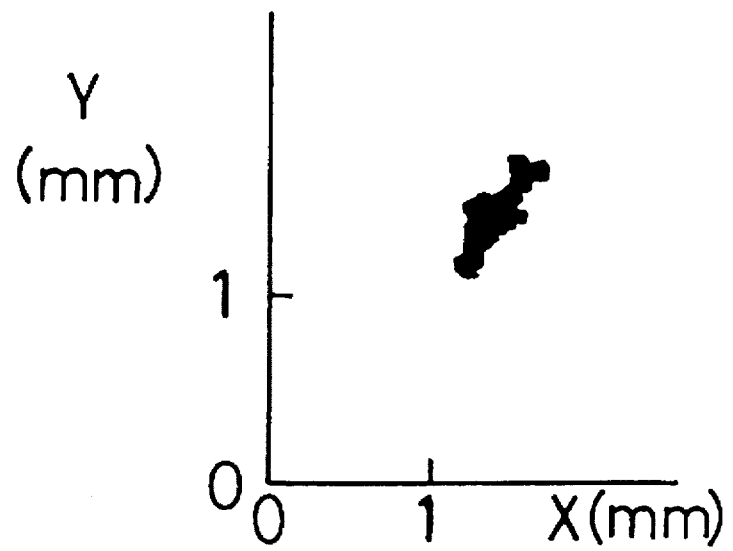
FIG. 3 is a chart showing a track of a fore end of the welding wire of the arc welding torch of the preferred embodiment of the present invention.

Further, the arc welding torch 1 was turned at an angle of 360° by the wrist of the robot 8, in the state shown in FIG. 2. FIG. 3 shows a track of the fore end of the welding wire 9 on X-Y two-dimensional axes of coordinates when the shaft center of the arc welding torch 1 was regarded as an origin (0, 0) of the X-Y two-dimensional axes of coordinates. In regard to the arc welding torch 1 of this preferred embodiment, the track was fixed in a position shifted from the origin by about 1.3 mm both in the X direction and in the Y direction, and the fore end of the welding wire 9 made almost no relative move with respect to the arc welding torch 1.

Figure 4:
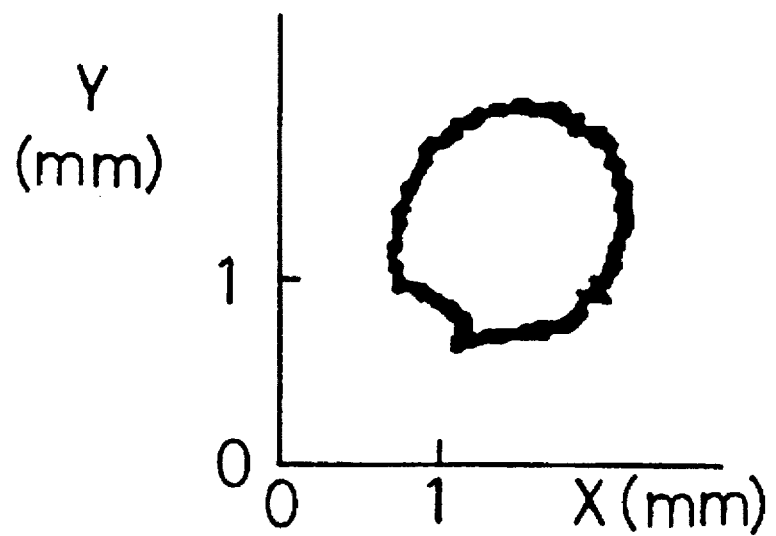
FIG. 4 is a chart showing a track of a fore end of welding wire of a conventional arc welding torch.
Figure 5:
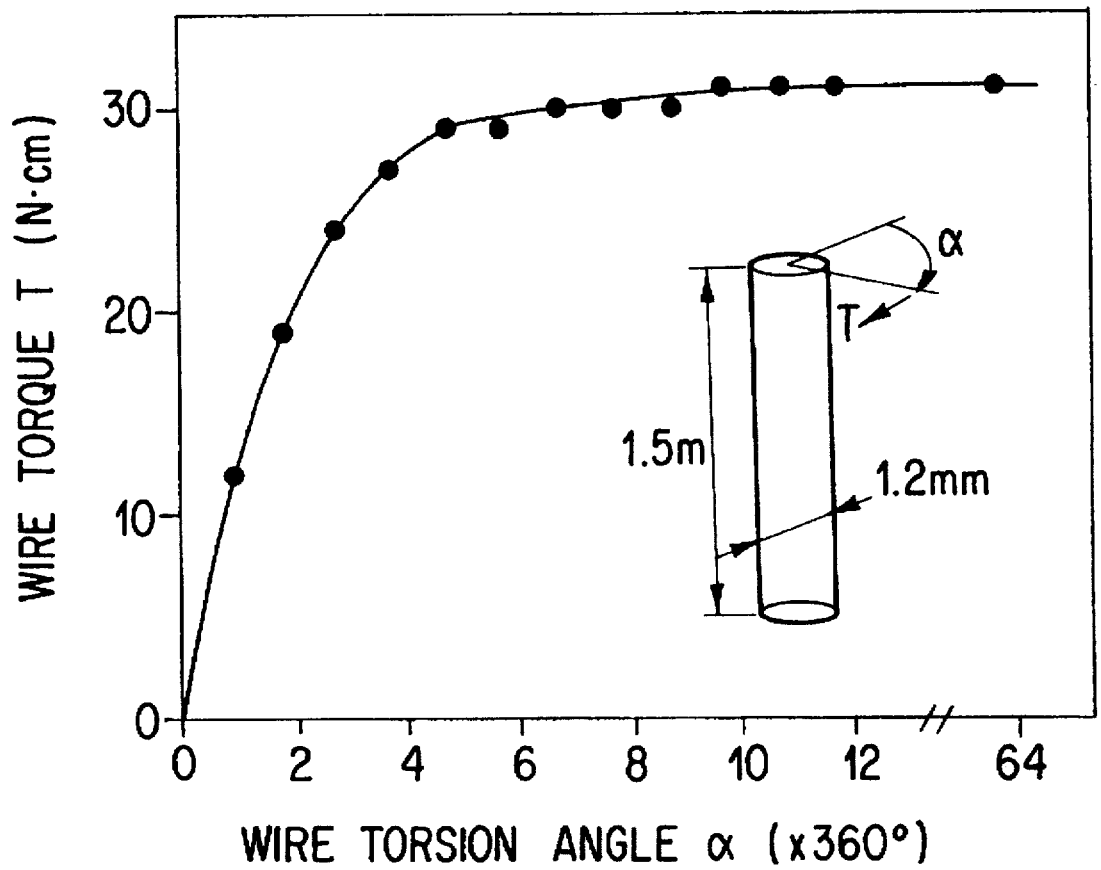
FIG. 5 is a graph showing a relation between wire torsion angle and wire torque.
Figure 6:
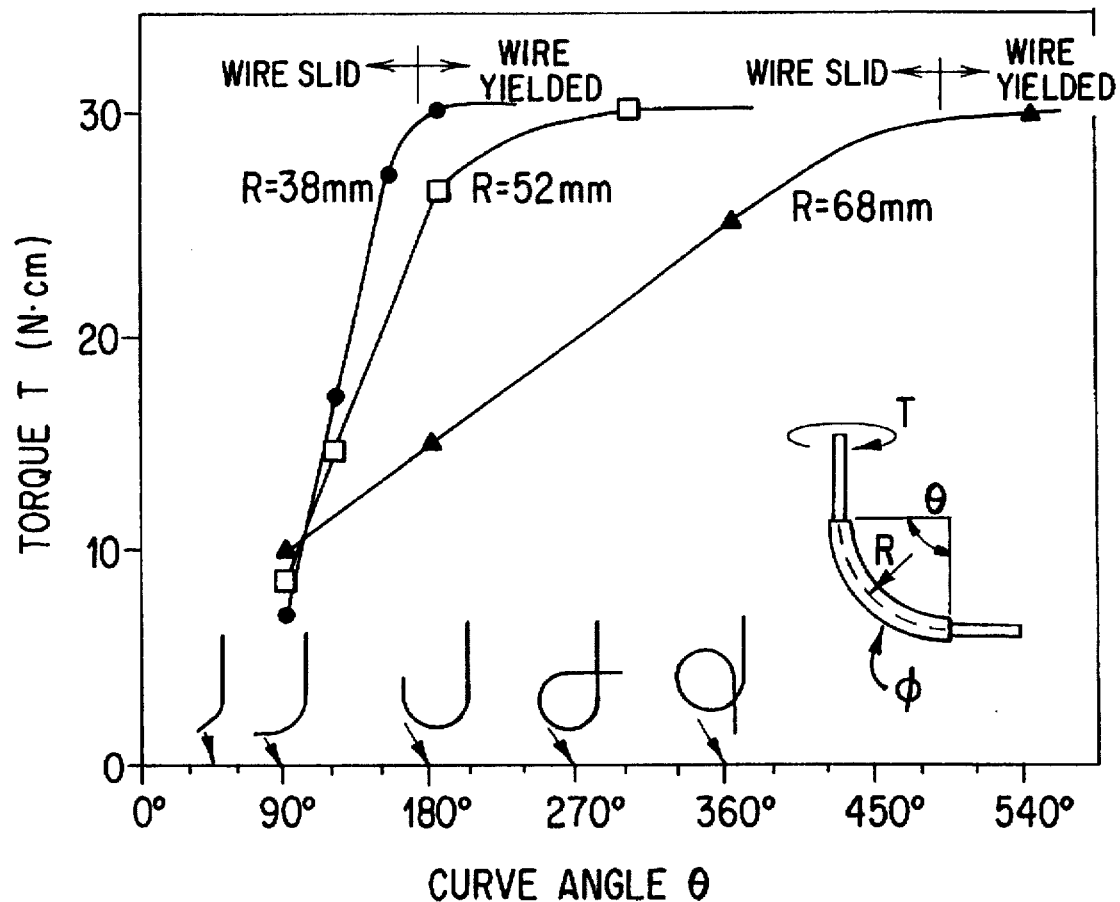
FIG. 6 is a graph showing a relation between curvature radii and curve angles of wire guide passages, and rotational torque of welding wires which relatively turned in the wire guide passages.

For reference, a track of a fore end of welding wire which turned in a tube of a conventional arc welding torch is shown in FIG. 4. When the welding wire turned in the tube of the arc welding torch, it is apparent from FIG. 4 that the fore end of the welding wire made a rotational move on the circumference of a circle of approximately 1.3 mm in radius.

Thus, when the welding wire relatively turns with respect to the current feed chip, the track of the fore end of the welding wire draw a circle as shown in FIG. 4, and the position of an electric arc varies in accordance with the rotational position of the welding wire. In contrast, in the arc welding torch of this preferred embodiment, since the welding wire does not turn, the fore end of the welding wire occupies the same position with respect to the current feed chip, and the position of an electric arc is not shifted. Therefore, it is possible to apply arc welding precisely to a desired part.

Obviously, many modifications and variations of the present invention are possible in the light of the above teachings. It is therefore to be understood that within the scope of the appended claims, the invention may be practiced otherwise than as specifically described.

What is claimed is:

1. An arc welding torch which is connected to a flexible wire guide conduit at one end, and provided with a current feed chip at the other end, and has a wire guide passage on the inside which welding wire penetrates, wherein:

said wire guide passage has a plurality of curves which are taken first in one direction and then in another direction along said passage, and curvature radius and curve angle of each of said curves are designed so that minimum torque T1 which is necessary for said welding wire to turn in said guide passage is greater than torque T2 which causes torsional yielding of said welding wire.

2. An arc welding torch in combination with welding wire of circular cross-section, the welding torch being connected to a flexible wire guide conduit at one end, and provided with a current feed chip at the other end, and having a wire guide passage on the inside which the welding wire penetrates, wherein, the wire guide passage has a plurality of curves which are taken first in one direction and then in another direction along said passage, and curvature radius and curve angle of each of the curves are designed so that minimum torque T1 which is necessary for the welding wire to turn in the guide passage is greater than torque T2 which causes torsional yielding of the welding wire.

* * * * *